US011650124B2

(12) United States Patent
Cho et al.

(10) Patent No.: US 11,650,124 B2
(45) Date of Patent: May 16, 2023

(54) PHASE SEPARATION SENSOR

(71) Applicant: AMERS INC., Hwaseong-si (KR)

(72) Inventors: Sang Ho Cho, Gumi-si (KR); Jong Sik Park, Daegu (KR); Byeol I Im, Gyeongsangbuk-do (KR)

(73) Assignee: Amers Inc., Hwaseong-si (KR)

( * ) Notice: Subject to any disclaimer, the term of this patent is extended or adjusted under 35 U.S.C. 154(b) by 144 days.

(21) Appl. No.: 17/260,253

(22) PCT Filed: Aug. 6, 2019

(86) PCT No.: PCT/KR2019/009800
§ 371 (c)(1),
(2) Date: Jan. 14, 2021

(87) PCT Pub. No.: WO2020/032539
PCT Pub. Date: Feb. 13, 2020

(65) Prior Publication Data
US 2022/0128432 A1 Apr. 28, 2022

(30) Foreign Application Priority Data

Aug. 6, 2018 (KR) .......................... 10-2018-0091267

(51) Int. Cl.
*G01M 3/40* (2006.01)
*G01N 27/06* (2006.01)

(52) U.S. Cl.
CPC .............. *G01M 3/40* (2013.01); *G01N 27/06* (2013.01)

(58) Field of Classification Search
CPC .......... G01M 3/40; G01M 3/16; G01M 3/165; G01N 27/06
See application file for complete search history.

(56) References Cited

U.S. PATENT DOCUMENTS

2020/0256758 A1* 8/2020 Mundt ...................... G06F 1/20

FOREIGN PATENT DOCUMENTS

JP 2014509394 A * 4/2014
JP 2015224880 A * 12/2015
(Continued)

OTHER PUBLICATIONS

KR-20160029612-A—English (Year: 2016).*
(Continued)

*Primary Examiner* — Daniel S Larkin
*Assistant Examiner* — Fatemeh Esfandiari Nia
(74) *Attorney, Agent, or Firm* — Quantum Patent Law Firm; Seongyoune Kang (57) ABSTRACT

The present invention relates to a phase separation sensor which can easily change its direction due to its flexible feature without using a corner connector even at a position limited in space or at a narrow space, and can separate and sense water and chemical solution so as to be easily used in outdoor environment exposed to rain, snow, hail or others. The phase separation sensor includes: a detection part (100) having a pair of detection lines (110, 120) spaced apart from each other in a width direction to be arranged side by side; and an insulation part (200) having insulation films (210, 220), which have detection holes (210a, 220a) formed at equal intervals in a longitudinal direction to be opposed to the detection part (100) and adhesive layers (211, 221) formed at areas of the insulation films (210, 220), which touch the detection lines (110, 120).

8 Claims, 6 Drawing Sheets (56) References Cited

FOREIGN PATENT DOCUMENTS

| KR | 100909242 B1 | * | 7/2008 |
| KR | 100933947 B1 | * | 10/2009 |
| KR | 102135683 B1 | * | 12/2009 |
| KR | 20110020199 A | * | 3/2011 |
| KR | 200471278 Y1 | * | 12/2012 |
| KR | 20150033516 A | * | 4/2015 |
| KR | 20160029612 A | * | 3/2016 |

OTHER PUBLICATIONS

JP-2015224880-A—English (Year: 2015).*
KR-20150033516-A—English (Year: 2015).*
KR-102135683-B1—English (Year: 2020).*
KR-100933947-B1—English (Year: 2012).*
JP-2014509394-A—English (Year: 2014).*
KR-20110020199-A—English (Year: 2011).*
KR-200471278-Y1—En (Year: 2012).*
KR-100909242-B1—En (Year: 2008).*

* cited by examiner

PHASE SEPARATION SENSOR

CROSS REFERENCE TO RELATED APPLICATIONS

This patent application is a U.S. national stage application of International Application No. PCT/KR2019/009800, filed Aug. 6, 2019, and the entire contents of which are incorporated herein by reference, which claims priority to KR 10-2018-0091267, filed Aug. 6, 2018 and the entire contents of which are incorporated herein by reference.

TECHNICAL FIELD

The present invention relates to a phase separation sensor, and more particularly, to a phase separation sensor which can separate and sense water and chemical solution, and can easily change its direction due to its flexible feature without using a corner connector even at a position limited in space or at a narrow space.

BACKGROUND ART

Various kinds of leak sensors are used in the industry for sensing a water leakage or an oil leakage in a leakage possible portion. As representative examples, there are a cable type leak sensor, a band type leak sensor, and a module type leak sensor.

The cable type leak sensor is a water or oil leakage sensor which makes it possible to more reliably sense the leakage of various liquids (water, oil or something) as well as which makes it possible to fast and precisely detect even leakage position.

In case of a water leakage or an oil leakage, such a leak sensor is capable of sensing an electric potential difference of electric current flowing along a leading wire by means of resistance of leaked water or oil, thereby precisely detecting a water or oil leakage.

However, such a cable type leak sensor has several disadvantages in that is expensive, and in that it is limited in use since the length of a sensor cable is unchangeably set. Moreover, the cable type leak sensor has further several disadvantages in that it is difficult to install since additional brackets must be used to install the sensor, in that it requires additional expenses, in that it takes much time to remove the properties after sensing the leaked properties, and in that it is difficult to connect with external devices.

The module type leak sensor includes a photo sensor (light receiver, and light emitter) in a plastic case. So, because the light receiver receives beam of the light emitter when not sensing liquid but the light receiver cannot receive a beam due to a change in a refractive index when beam of the light emitter detects liquid, the leak sensor detects a leak through a received state of beam.

Such a module type leak sensor is capable of detecting a leakage possible portion at a relatively lower price, is easy to install, is capable of generating an alarm regardless of peripheral devices, and has little error with respect to a moisture. However, the module type leak sensor has several disadvantages in that it can detect a leak only at a specific position differently from the cable type leak sensor and in that it is difficult to connect with peripheral devices. Furthermore, the module type leak sensor has further several disadvantages in that it takes lots of time to install products since it requires a plan for fixing the sensor, and in that it is difficult to detect a leak when a leakage position is changed since it can detect only a specific portion of the leakage possible portion. In the meantime, in order to solve the above disadvantages, Korean patent No. 10-0909241 discloses a leak sensor having a hole point. However, the leak sensor has a disadvantage in that it cannot sense whether or not there is a leak due to a low reactivity since it is difficult for the leaking liquid which has viscosity, such as sulfuric acid, hydrofluoric acid, hydrochloric acid, or nitric acid, to permeate into a hole even though there is a leak. Especially, once the leak sensor detects the leak since the adopted synthetic resin is weak to acid, it cannot be reused since the synthetic resin melts. Especially, because a portion exposed to acid to sense a leak and made of metals, such as silver, is corroded when getting in contact with acid, the leak sensor cannot be reused and the portion which is exposed to acid to detect a leak must be cut and removed.

Especially, the bend type leak detection sensor can detect a leak according to a change in its resistance value since the resistance value is changed when water touches an electric wire while electric current flows through the electric wire. The band type leak detection sensor can detect a leak of a wide area at a relatively low price and is easy to install.

However, the bend type leak detection sensor has several disadvantages in that an error rate is high due to high humidity or external shock, in that it cannot easily check an exact leakage position, and in that a product installation is poor since there is no connectivity in installation. Additionally, the bend type leak detection sensor has further several disadvantages in that it is expensive as compared to performance, and in that it is difficult to install since a bracket to be fastened at the floor must be mounted separately.

In order to overcome the above problems, Korean Patent No. 10-1479177 discloses a leak sensor of a tape or sheet type for sensing material properties, which is adhered onto a place where occurrence of a leak is expected without any bracket in order to rapidly detect a leak when there is a leak of a fluid. However, the leak sensor is disadvantageous in that it is not easy to remove the leaked fluid since the leak sensor for sensing material properties is adhered integrally and the entire product must be replaced with a new one since it is difficult to maintain and repair.

In addition, in case that the conventional leak sensors have a limitation in installation spaces, they can change their directions when two leak sensors are connected by the medium of a corner connector. However, the conventional leak sensors are disadvantageous in that they require two or more leak sensors to change the direction and in that they have difficulty in maintenance since needing the corner connector of a high price.

DISCLOSURE

Technical Problem

Accordingly, the present invention has been made in an effort to solve the above-mentioned problems occurring in the prior arts, and it is an object of the present invention to provide a phase separation sensor which can easily change its direction due to its flexible feature without using a corner connector even at a position limited in space or at a narrow space, and which can separate and sense water and chemical solution so as to be easily used in outdoor environment exposed to rain, snow, hail or others.

Technical Solution

The present invention relates to a phase separation sensor which can easily change its direction due to its flexible feature without using a corner connector even at a position limited in space or at a narrow space, and can separate and sense water and chemical solution so as to be easily used in outdoor environment exposed to rain, snow, hail or others. To achieve the above objects, the present invention provides a phase separation sensor including: a detection part (100) having a pair of detection lines (110, 120) spaced apart from each other in a width direction to be arranged side by side; and an insulation part (200) having insulation films (210, 220), which have detection holes (210a, 220a) formed at equal intervals in a longitudinal direction to be opposed to the detection part (100) and adhesive layers (211, 221) formed at areas of the insulation films (210, 220), which touch the detection lines (110, 120).

Advantageous Effects

The phase separation sensor according to the present invention can separate and sense water and chemical solution so as to be used in outdoor environment exposed to rain, snow, hail or others without a malfunction.

Moreover, the phase separation sensor according to the present invention can easily change its direction by being folded due to its flexible feature without using a corner connector even at a position limited in space or at a narrow space.

Furthermore, the phase separation sensor according to the present invention can prevent exfoliation or separation between the detection lines and the insulation films while the detection lines and the insulation films are heated and pressed by rollers since the adhesive layers are formed at areas of the insulation films which touch the detection lines, and can be used for a long time since being excellent at stability and durability.

Additionally, the phase separation sensor according to the present invention is easy in storage, carrying and stock management since being provided as a strip type product which is rolled in the longitudinal direction in a state where the detection part and the insulation part are manufactured by being heated and pressed, and allows a user to selectively cut the strip type phase separation sensor product to use.

<Explanation of essential reference numerals in drawings>

| | |
|---|---|
| 100: detection part | 110, 120: detection line |
| 200: insulation part | 210, 220: insulation film |
| 210a, 220a: detection hole | 211, 221: adhesive layer |
| 300: end connector | 400: control unit |
| 410: voltage input part | 420: current measuring part |
| 430: decision part | |

MODE FOR INVENTION

Hereinafter, reference will be now made in detail to the preferred embodiment of the present invention with reference to the attached drawings.

Figure 1:
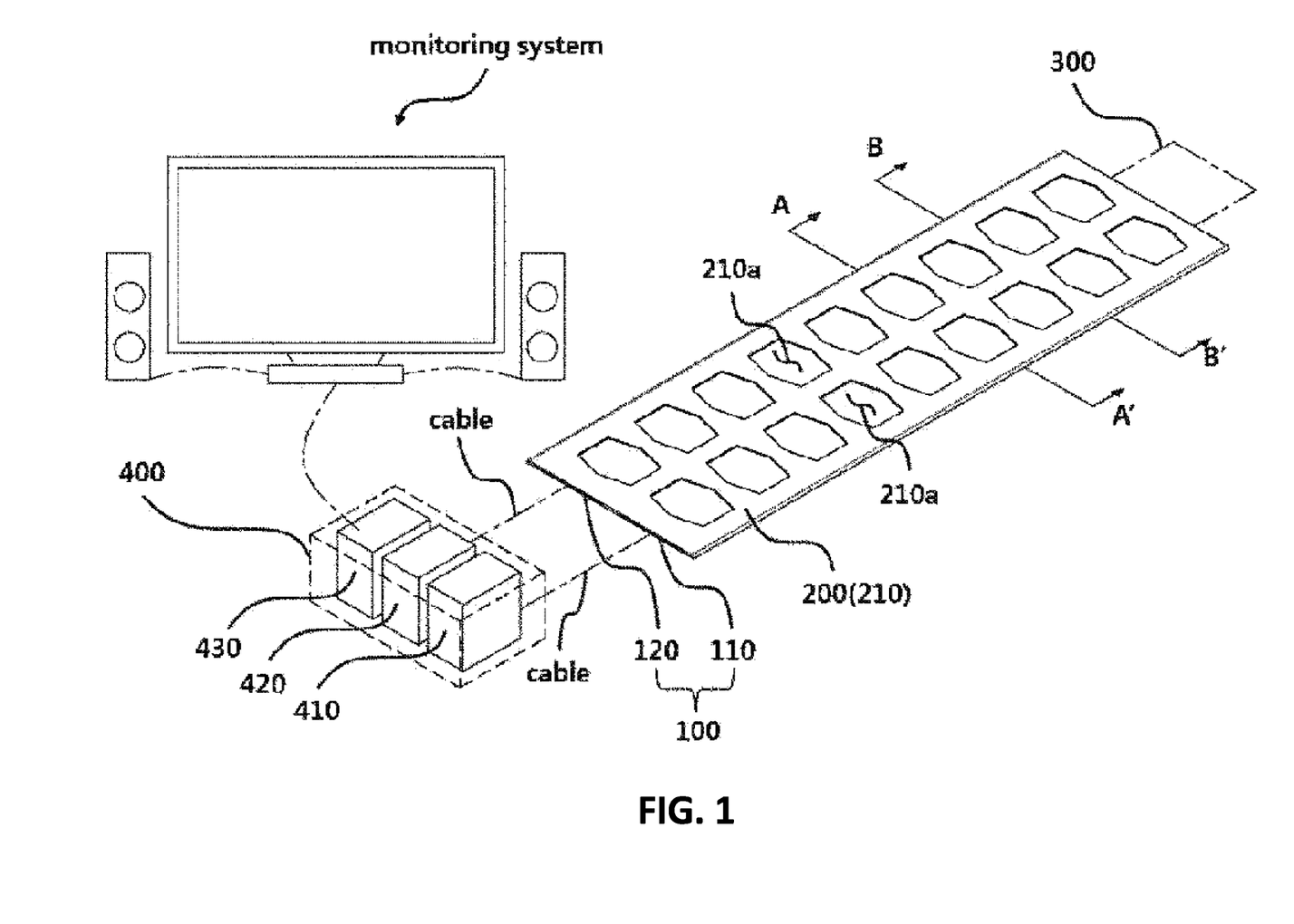
FIG. 1 is a perspective view of a phase separation sensor according to an embodiment of the present invention.
Figure 2:
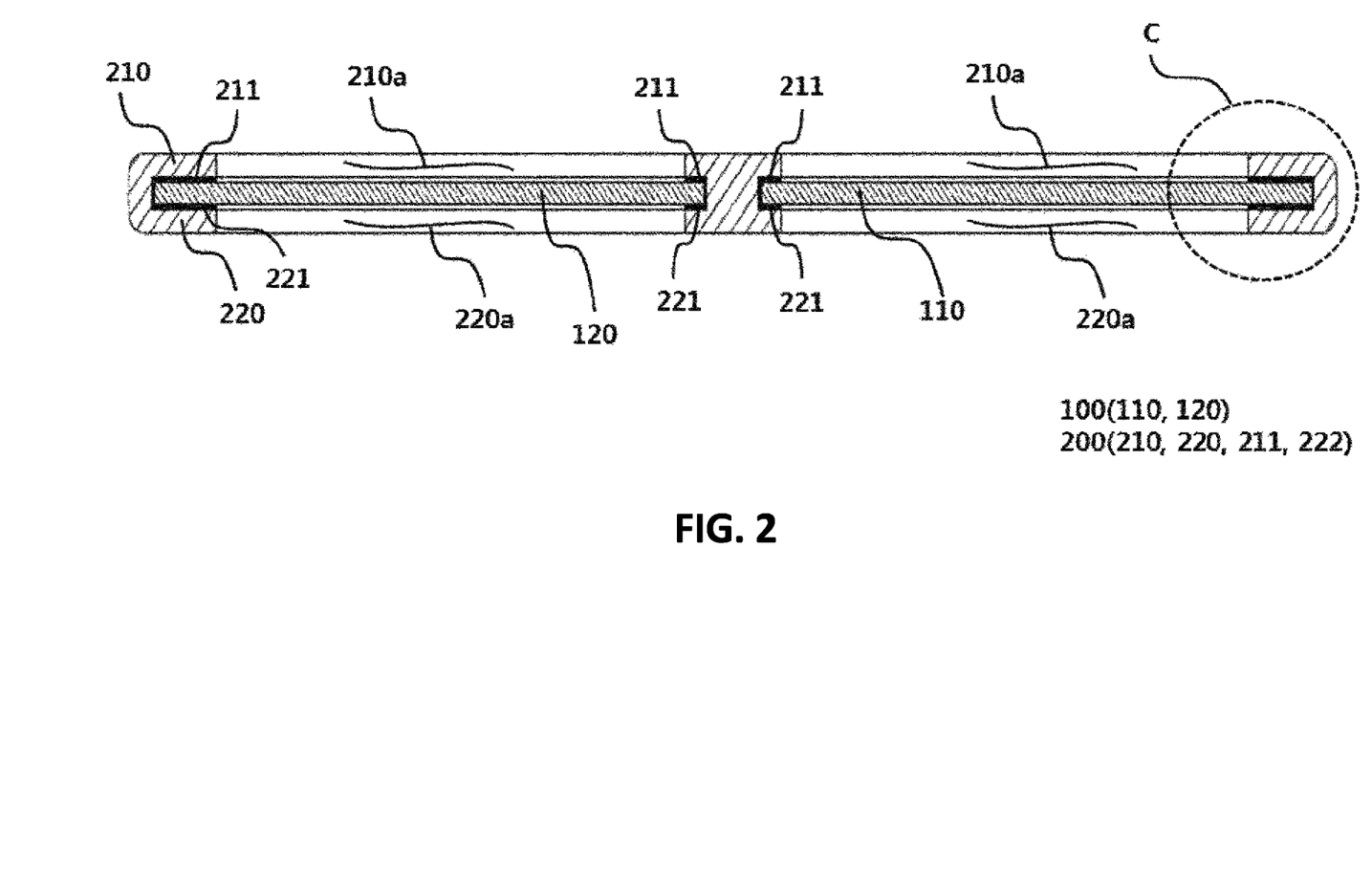
FIG. 2 is a sectional view showing a cross section taken along the line of A-A' of FIG. 1.
Figure 3:
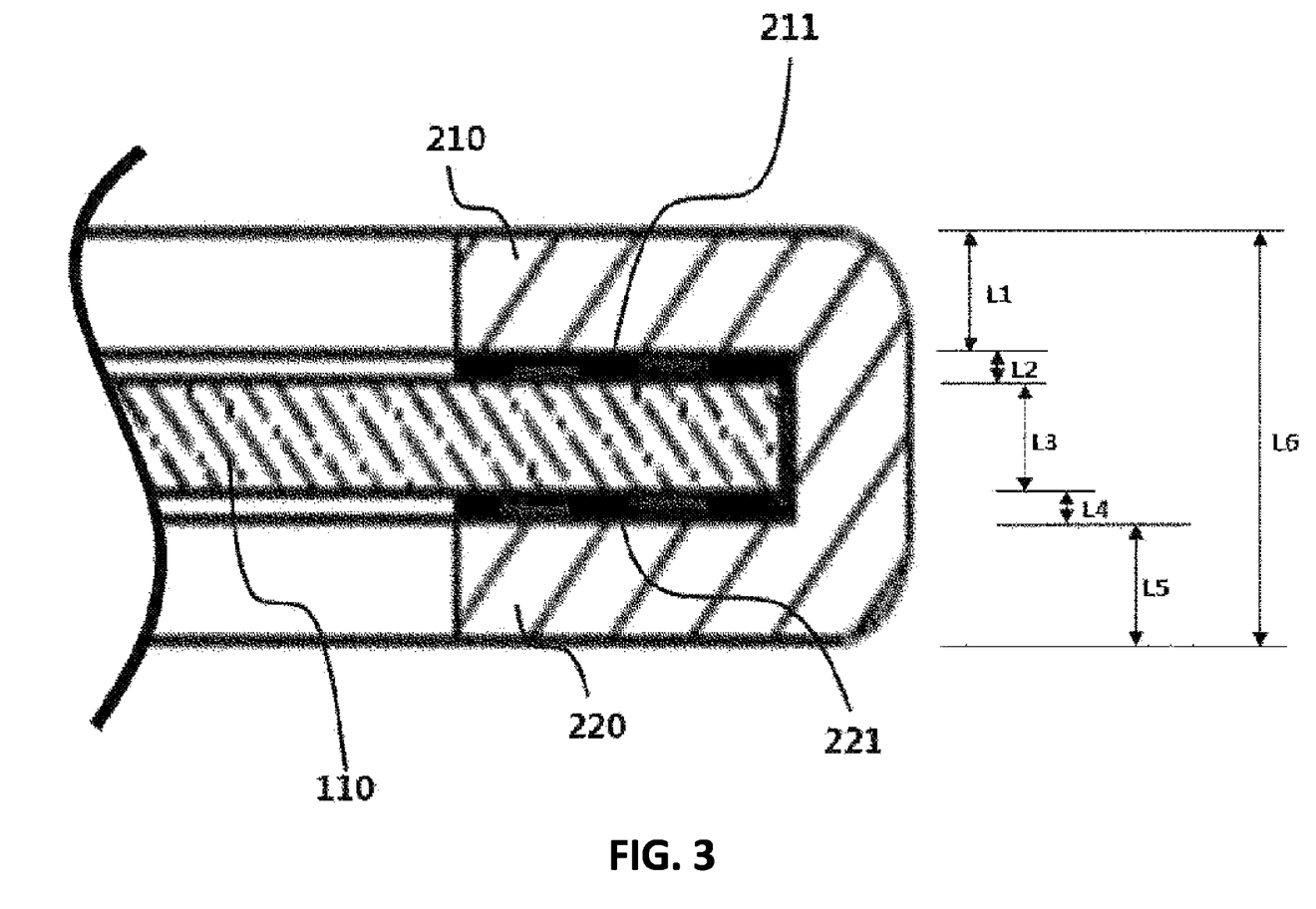
FIG. 3 is an enlarged view of a part 'C' of FIG. 2.
Figure 4:
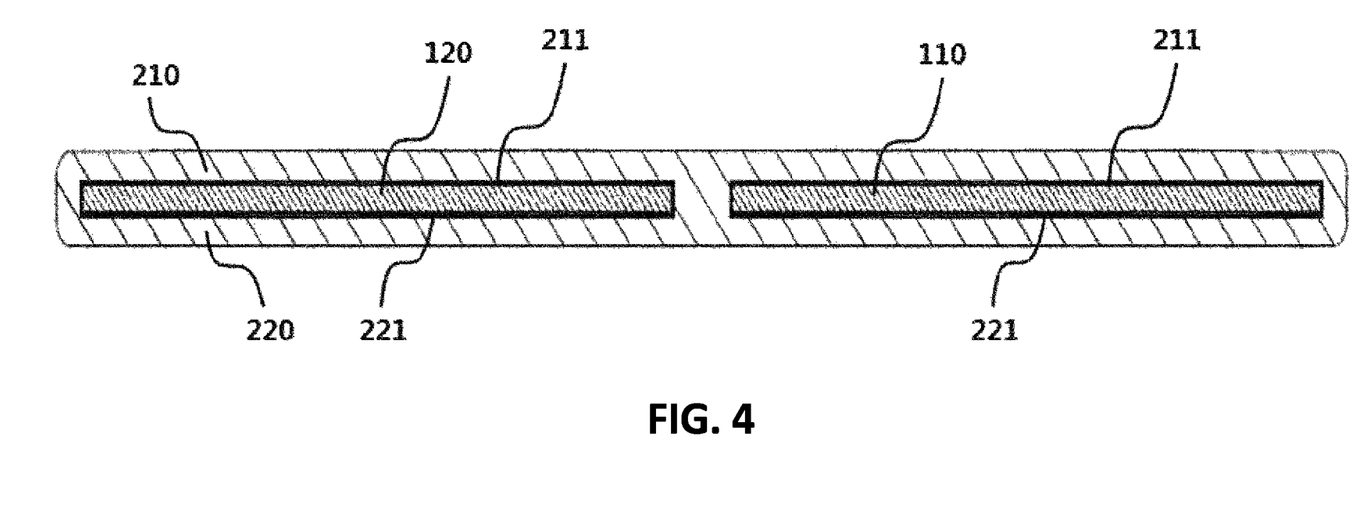
FIG. 4 is a sectional view showing a cross section taken along the line of B-B' of FIG. 1.
Figure 5:
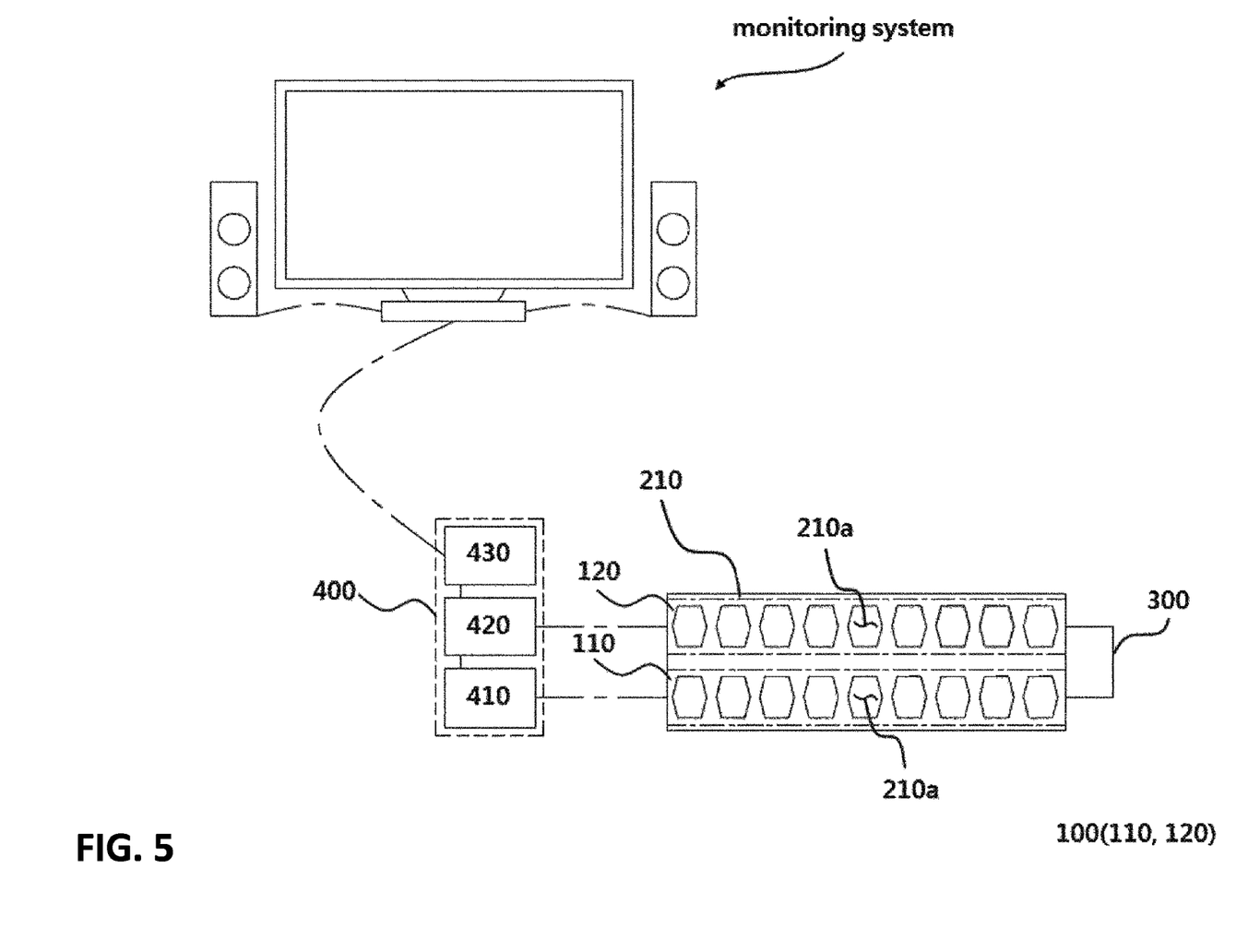
FIG. 5 is a plan view of the phase separation sensor according to the embodiment of the present invention.
Figure 6:
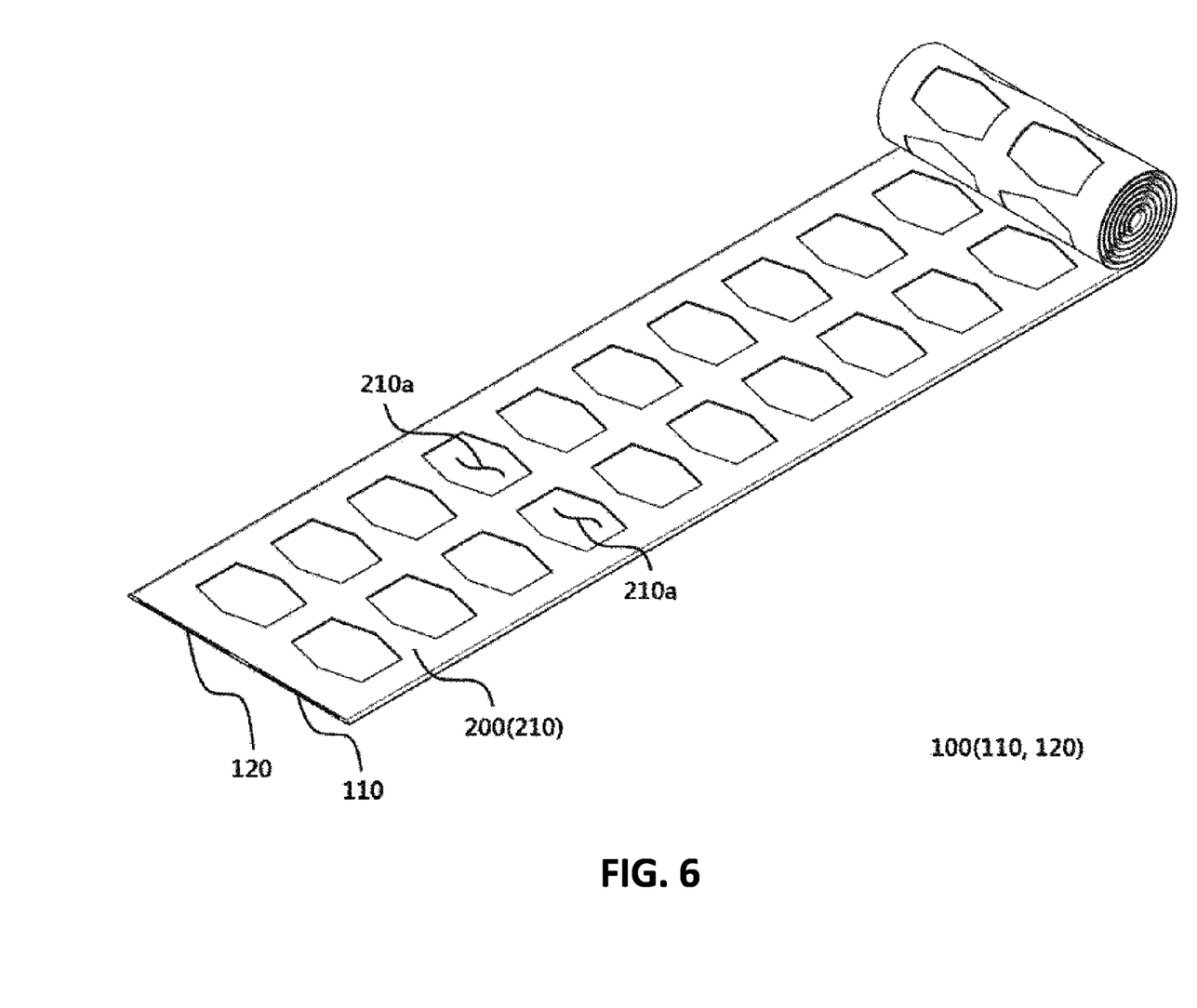
FIG. 6 is a perspective view showing a state where a detection part and an insulation part of the phase separation sensor according to the embodiment of the present invention are rolled in a strip form.

FIG. 1 is a perspective view of a phase separation sensor according to an embodiment of the present invention, FIG. 2 is a sectional view showing a cross section taken along the line of A-A' of FIG. 1, FIG. 3 is an enlarged view of a part 'C' of FIG. 2, FIG. 4 is a sectional view showing a cross section taken along the line of B-B' of FIG. 1, FIG. 5 is a plan view of the phase separation sensor according to the embodiment of the present invention, and FIG. 6 is a perspective view showing a state where a detection part and an insulation part of the phase separation sensor according to the embodiment of the present invention are rolled in a strip form.

As shown in FIGS. 1 to 6, the phase separation sensor according to an embodiment of the present invention can separate and sense water and chemical solution, and can easily change its direction by being folded due to its flexible feature without using a corner connector even at a position limited in space or at a narrow space. The phase separation sensor according to the embodiment of the present invention includes: a detection part 100 having a pair of detection lines 110 and 120 spaced apart from each other in a width direction to be arranged side by side; and an insulation part 200 having insulation films 210 and 220, which have detection holes 210a and 220a formed at equal intervals in a longitudinal direction to be opposed to the detection part 100 and adhesive layers 211 and 221 formed at areas of the insulation films 210 and 220, which touch the detection lines 110 and 120.

The detection part 100 is a way of generating an electric current when there is a leak of a fluid, such as water or chemical solution, has a long band shape which is narrow in a width direction, and includes a pair of the detection lines 110 and 120 spaced apart from each other in a width direction to be arranged side by side.

The detection lines 110 and 120 are made of conductive metal and are arranged to be spaced apart from each other. If there is a leak of a fluid, such as water or chemical solution, from a space between one of the detection lines 110 and 120 and the other one of the detection lines 110 and 120, the detection lines 110 and 120 which are disconnected electrically are connected so that electricity flows. That is, the phase separation sensor is operated in such a way as to detect the connection of electricity.

Moreover, preferably, the detection lines 110 and 120 are made of stainless steel which is conductive metal. One of the detection lines is an electron donor and serves as a reducing agent causing oxidation, and the other one of the detection lines 110 and 120 is an electron acceptor and serves as an oxidizing agent causing reduction.

That is, if there is a leak of a fluid, such as water or chemical solution, from a space between one of the detection lines 110 and 120 and the other one of the detection lines 110 and 120, the leaked fluid serves as an electrolyte to move materials which have electric charge, and in this instance, the phase separation sensor according to the present invention can detect whether the leaked fluid is water or chemical solution by comparing the generated current value with a predetermined current value for sensing water and chemical solution (when there is water, it outputs a current value lower than a current value generated when there is chemical solution since water is relatively lower electrolyte than chemical solution).

In this instance, SUS 304, SUS 316, SUS 316L or others may be selectively applied to the detection lines 110 and 120.

Especially, SUS 304 is steel containing carbon of 0.08% by weight, chromium of 18 to 20% by weight, and nickel of 8 to 11% by weight and is excellent at corrosion resistance. SUS 316 is steel containing carbon of 0.08% by weight, chromium of 16 to 18% by weight, nickel of 10 to 14% by weight, and a small quantity of silicon and is excellent at corrosion resistance, acid resistance, and chemical resistance. However, SUS 316 is lower in intensity than SUS 304. SUS 316L is steel containing carbon of 0.03% by weight, chromium of 12 to 15% by weight, and nickel of 16 to 18% by weight, has excellent machinability due to a reduced carbon content, is resistant to corrosion, but is weak in intensity. Therefore, SUS 304, SUS 316, SUS 316L can be selectively applied according to cost prices and environment where the phase separation sensor is exposed.

The insulation part 200 is made of an insulating material which electricity does not flow in order to protect the detection part 100. A certain portion of the detection part 100 is means to be exposed to the outside, and includes the insulation films 210 and 220 arranged and adhered to upper and lower portions of the detection part 100, and the adhesive layers 211 and 221 formed on areas of the insulation films 210 and 220, which touch the detection lines 210 and 220.

The insulation films 210 and 220 protect the detection lines 110 and 120. Because some areas of the detection lines 110 and 120 are exposed to the outside, if there is a leak of the fluid, such as water or chemical solution, between the area of one among the detection lines 110 and 120 which is exposed to the outside and the area of the other one among the detection lines 110 and 120 which is exposed to the outside, the detection lines 110 and 120 which are disconnected electrically are connected electrically so that electricity flows. The insulation films 210 and 220 are means to be operated by sensing connection of electricity when electricity flows, is made of an insulating material that electricity does not flow, is excellent at thermal resistance, contamination resistance, chemical resistance, and corrosion resistance, is capable of being used even in an exposed environment, and is made of polyethylene terephthalate (PET) which is a flexible material.

Moreover, the insulation films 210 and 220 may be manufactured in a way to be heated and pressed by rollers arranged at upper and lower portions of the detection part 100, and the detection holes 210a and 220a are formed at equal intervals in the longitudinal direction to be opposed to the detection part 100.

Especially, because the insulation films 210 and 220 can detect a leak of the fluid even though a relatively small amount of fluid leaks when a distance between the exposed area of one detection line 110 of the detection part 100 through the detection hole 210a and the exposed area of the other detection line 120 through the detection hole 220a is short, the detection holes 210a and 220a respectively formed in the insulation films 210 and 220 are formed in such a way that the detection hole 210a for exposing the detection line 110 of the detection part 100 to the outside and the detection hole 220a for exposing the detection line 210 to the outside are near to each other.

Additionally, in the embodiment of the present invention, the detection holes 210a and 220a are formed to be a hexagonal shape in a top view, but are not limited to the above shape, and a round shape, a triangular shape, a rectangular shape or other polygonal shapes may be selectively applied to the detection holes 210a and 220a.

The phase separation sensor according to the embodiment of the present invention may be a strip type product rolled in the longitudinal direction in the state where the detection part 100 and the insulation part 200 are manufactured by being heated and pressed. A user can cut and use the phase separation sensor to a required length while installing the phase separation sensor for sensing a leak of a fluid.

The adhesive layers 211 and 221 are means of firmly adhere the detection lines 110 and 120 and the insulation films 210 and 220 without exfoliation or separation while the detection lines 110 and 120 and the insulation films 210 and 220 are heated and pressed by the rollers, so that the detection lines 110 and 120 and the insulation films 210 and 220 are easily adhered.

Especially, the adhesive layers 211 and 221 are formed areas of the insulation films 210 and 220 which touch the detection lines 110 and 120, and is preferably made of polyethylene (PE) that is an insulating material and is excellent at water resistance, acid resistance, alkali resistance, and heat stability and that electricity does not flow.

Especially, the phase separation sensor according to the embodiment of the present invention has a flexible feature without using additional device, such as a corner connector, even at a position limited in space or at a narrow space so as to change its direction by being folded. In order to change its direction, preferably, a thickness (L3) of the detection lines 110 and 120 is 0.1 to 0.3 mm, a thickness (L1 and L5) of the insulation films 210 and 220 is 0.1 to 0.3 mm, and a thickness (L2 and L4) of the adhesive layers 211 and 221 is 0.05 to 0.08 mm.

That is, the thickness (L3) of the detection lines 110 and 120 is 0.1 to 0.3 mm to provide a stable detection resistance, to be used repeatedly several tens times and to have sufficient bending force, the thickness (L1 and L5) of the insulation films 210 and 220 and the thickness (L2 and L4) of the adhesive layers 211 and 221 are respectively is 0.1 to 0.3 mm and 0.05 to 0.08 mm to prevent exfoliation or separation between the detection part 100 and the insulation part 200 while the detection lines 110 and 120 and the insulation films 210 and 220 are heated and pressed by the rollers.

The sum (L6) of thicknesses of the detection part 100 and the insulation part 200, namely, the thickness (L6) of the phase separation sensor according to the embodiment of the present invention is preferably 0.6 mm to have sufficient bending force and to prevent exfoliation or separation.

The phase separation sensor according to the embodiment of the present invention further includes: an end connector 300 for electrically connecting ends of the detection lines 110 and 120; and a control unit 400 connected and mounted by the medium of a cable for electrically connecting the other ends of the detection lines 110 and 120.

The end connector 300 and the control unit 400 serve separate water and chemical solution and to detect disconnection.

That is, the end connector 300 is mounted to check a disconnected state that electricity does not flow under a condition that the phase separation sensor must be operated normally without any leak of the fluid, and decides disconnection if a current value outputted from the control unit 400 is 0.

The control unit 400 includes: a voltage input part 410 for inputting voltage to any one of the detection lines 110 and 120; a current measuring part for measuring an electric current outputted through any one of the detection lines 110 and 120; and a decision part 430 for deciding whether the sensor is operated normally, water exists or chemical solution exists by comparing a current value measured by the current measuring part 420 with a predetermined current value for sensing normal operation, existence of water or existence of chemical solution.

The voltage input part 410 is a way of applying voltage to any one of the detection line 110 and 120 connected electrically by medium of the end connector 300, and especially, can be set by the user according to environment where the phase separation sensor is installed within a range of DC 3V to DC 24V.

That is, in a formula of V(voltage)=I(current)*R(resistance), the voltage value is set according to factors changing R (resistance), such as a length of the detection part, a cross-section area of the detection part, a specific resistance to the material of the detection part, therefore, a uniform current value is outputted if there is no disconnection or there is no leak of a fluid, such as water or chemical solution.

For instance, if there are lots of noises to an input signal since a distance between the detection part 100 and the control unit 400 of the phase separation sensor according to the embodiment of the present invention is far, a relatively high voltage of DC 24V is preferably applied. Contrariwise, if there is little noise to the input signal since the distance between the detection part 100 and the control unit 400 of the phase separation sensor according to the embodiment of the present invention is short, a relatively low voltage of DC 3V is preferably applied.

The voltage measuring part 420 is to measure an electric current outputted through any one detection line 120 of the detection lines 110 and 120 when a voltage is applied to the other one 110 of the detection lines 110 and 120 connected and mounted electrically by medium of the end connector 300.

The decision part 430 compares the current value measured by the current measuring part 420 with the predetermined current values in order to decide whether there is a leak of the fluid. The predetermined current value for sensing the normal operation is from more than 0 to less than 10 mA, the predetermined current value for sensing existence of water is from 10 mA to less than 350 mA, and the predetermined current value for sensing existence of chemical solution is more than 350 mA.

The predetermined current value for sensing the normal operation, the predetermined current value for sensing existence of water, and the predetermined current value for sensing existence of chemical solution were set through results to measure current values obtained under the conditions set in the following table.

TABLE 1

| Item | Length of detection line | Input voltage |
|---|---|---|
| Condition | 120 m | DC 3 V |

The Table 1 is to set minimum values (lowest values) of the predetermined current value for sensing the normal operation, the predetermined current value for sensing existence of water, and the predetermined current value for sensing existence of chemical solution. Resistance (R) was set to be maximum (length of the detection line was 120 m), and voltage (V) was set to be minimum (input voltage was DC 3V).

TABLE 2

| Item | Length of detection line | Input voltage |
|---|---|---|
| Condition | 5 m | DC 24 V |

The Table 2 is to set maximum values (upper values) of the predetermined current value for sensing the normal operation, the predetermined current value for sensing existence of water, and the predetermined current value for sensing existence of chemical solution. Resistance (R) was set to be minimum (length of the detection line was 5 m), and voltage (V) was set to be maximum (input voltage was DC 24V).

In Tables 1 and 2, the cross-section areas of the detection lines 110 and 120 were the same. In Table 1, the current value for sensing existence of water, and the current value for sensing existence of chemical solution were measured in a state where an amount of water was 1 mL and an amount of chemical solution was 1 mL. In this instance, the chemical solution means solution in which chemical solution, such as caustic soda, sulfuric acid, or hydrochloric acid, of 10% by weight and water of 90% by weight are mixed. In Table 2, water had a sufficient amount in which the detection part 100 and the insulation part 200 were deposited, and the chemical solution had a sufficient amount in which the detection part 100 and the insulation part 200 were deposited. In this instance, the chemical solution means solution in which chemical solution, such as silver nitrate, caustic soda, sulfuric acid, or hydrochloric acid, of 20% by weight and water of 80% by weight are mixed.

TABLE 3

|  | Normal operation | Water existence | Chemical solution existence |
|---|---|---|---|
| Measured current value | More than 0 to less than 5 mA | More than 10 mA to less than 30 mA | More than 350 mA |

TABLE 4

|  | Normal operation | Water existence | Chemical solution existence |
|---|---|---|---|
| Measured current value | More than 0 to less than 10 mA | More than 20 mA to less than 350 mA | More than 400 mA |

Table 3 shows current values measured at the time of normal operation, existence of water and existence of chemical solution according to Table 1, and Table 4 shows current values measured at the time of normal operation, existence of water and existence of chemical solution according to Table 2.

The current value of more than 0 to less than 10 mA was measured when water or chemical solution did not exist and the sensor was operated normally under the condition of input voltage of DC 3V up to DC 24V, so that the predetermined current value for sensing normal operation was set to be more than 0 to less than 10 mA.

If there is water under the condition of input voltage of DC 3V up to DC 24V, the current value of more than 10 mA to less than 350 mA was measured, so that the predetermined current value for sensing existence of water was set to be more than 10 mA to less than 350 mA.

If there is chemical solution under the condition of input voltage of DC 3V up to DC 24V, the current value of 350 mA or more was measured, so that the predetermined current value for sensing existence of chemical solution was set to be 350 mA or more.

In the meantime, the decision part 430 may decide that the phase separation sensor according to the embodiment of the present invention is disconnected electrically when the current value measured by the current measuring part 420 is 0.

Additionally, the phase separation sensor according to the embodiment of the present invention may further include: a monitor which is electrically connected with the decision part 340 for deciding electrical disconnection, normal operation, existence of water, and existence of chemical solution to receive a decision signal from the decision part 340, and displays visual information of various kinds according to electrical disconnection, normal operation, existence of water, and existence of chemical solution so that the user can recognize visually according to the received signal; and/or a voice output device for outputting acoustic information of various kinds according to electrical disconnection, normal operation, existence of water, and existence of chemical solution so that the user can recognize acoustically.

Therefore, the phase separation sensor according to the present invention can separate and sense water and chemical solution so as to be used in outdoor environment exposed to rain, snow, hail or others without a malfunction.

Moreover, the phase separation sensor according to the present invention can easily change its direction by being folded due to its flexible feature without using a corner connector even at a position limited in space or at a narrow space.

Furthermore, the phase separation sensor according to the present invention can prevent exfoliation or separation between the detection lines 110 and 120 and the insulation films 210 and 220 while the detection lines 110 and 120 and the insulation films 210 and 220 are heated and pressed by rollers since the adhesive layers 211 and 221 are formed at areas of the insulation films 210 and 220 which touch the detection lines 110 and 120, and can be used for a long time since being excellent at stability and durability.

Additionally, the phase separation sensor according to the present invention is easy in storage, carrying and stock management since being provided as a strip type product which is rolled in the longitudinal direction in a state where the detection part 100 and the insulation part 200 are manufactured by being heated and pressed, and allows a user to selectively cut the strip type phase separation sensor product to use.

While the present invention has been particularly shown and described with reference to the preferred embodiment thereof, it will be understood by those of ordinary skill in the art that the present invention is not limited to the above but is limited by the following claims. Therefore, it will be understood by those of ordinary skill in the art that various changes in form and details may be made therein without departing from the spirit and scope of the present invention as defined by the following claims.

INDUSTRIAL APPLICABILITY

As described above, the phase separation sensor according to the present invention can separate and sense water and chemical solution so as to be used in outdoor environment exposed to rain, snow, hail or others without a malfunction.

Moreover, the phase separation sensor according to the present invention can easily change its direction by being folded due to its flexible feature without using a corner connector even at a position limited in space or at a narrow space.

Furthermore, the phase separation sensor according to the present invention can prevent exfoliation or separation between the detection lines and the insulation films while the detection lines and the insulation films are heated and pressed by rollers since the adhesive layers are formed at areas of the insulation films which touch the detection lines, and can be used for a long time since being excellent at stability and durability.

Additionally, the phase separation sensor according to the present invention is easy in storage, carrying and stock management since being provided as a strip type product which is rolled in the longitudinal direction in a state where the detection part and the insulation part are manufactured by being heated and pressed, and allows a user to selectively cut the strip type phase separation sensor product to use. Therefore, the phase separation sensor according to the present invention is highly industrially applicable.

The invention claimed is:

1. A property separation sensor comprising:
   a detection part including a pair of detection lines spaced apart from each other in a width direction to be arranged side by side;
   an insulation part including insulation films, which have detection holes formed at equal intervals in a longitudinal direction to be opposed to the detection part and adhesive layers formed at areas of the insulation films, which touch the detection lines, the detection holes defining respective exposed areas of the pair of detection lines at which the detection lines are exposed to the outside;
   an end connector for electrically connecting ends of the detection lines; and
   a control unit for connecting the other ends of the detection lines by medium of a cable,
   wherein the control unit comprises:
   a voltage input part for inputting voltage to any one of the detection lines;
   a current measuring part for measuring an electric current outputted through any one of the detection lines; and
   a decision part for deciding whether the sensor is operated normally, water exists or a chemical solution exists by comparing a current value measured by the current measuring part with a predetermined current value for sensing normal operation, presence of water or presence of a chemical solution,
   wherein a predetermined current value for sensing the normal operation is 0, a predetermined current value for sensing the normal operation is more than 0 to less than 10 mA, a predetermined current value for sensing the presence of water is from 10 mA to less than 350 mA, and a predetermined current value for sensing the presence of achemical solution is equal to or more than 350 mA,
   wherein a thickness of the detection lines is 0.1 to 0.3 mm, a thickness of the insulation films is 0.1 to 0.3 mm, and a thickness of the adhesive layers is 0.05 to 0.08 mm,
   wherein a sum of thicknesses of the detection part and the insulation part is 0.6 mm,
   wherein the adhesive layers are formed at areas of the insulation films which touch the detection lines when the insulation films are heated and pressed by rollers arranged at upper and lower portions of the detection part, and wherein the adhesive layers do not cover the exposed areas of the pair of detection lines.

2. The property separation sensor according to claim 1, wherein the detection lines are made of stainless steel.

3. The property separation sensor according to claim 1, wherein the adhesive layers are made of polyethylene (PE).

4. The property separation sensor according to claim 1, wherein the insulation part is made of polyethylene terephthalate (PET).

5. A property separation sensor comprising:

a detection part including a pair of detection lines spaced apart from each other in a width direction to be arranged side by side;

an insulation part including insulation films, which have detection holes formed at equal intervals in a longitudinal direction to be opposed to the detection part and adhesive layers formed at areas of the insulation films, which touch the detection lines, the detection holes defining respective exposed areas of the pair of detection lines at which the detection lines are exposed to the outside; and an end connector for electrically connecting ends of the detection lines; and wherein the adhesive layers are formed at areas of the insulation films which touch the detection lines when the insulation films are heated and pressed by rollers arranged at upper and lower portions of the detection part, and wherein the adhesive layers do not cover the exposed areas of the pair of detection lines.

6. The property separation sensor according to claim 5, wherein the detection lines are made of stainless steel.

7. The property separation sensor according to claim 5, wherein the adhesive layers are made of polyethylene (PE).

8. The property separation sensor according to claim 5, wherein the insulation part is made of polyethylene terephthalate (PET).

* * * * *